US009209886B2

(12) United States Patent
Kim et al.

(10) Patent No.: US 9,209,886 B2
(45) Date of Patent: Dec. 8, 2015

(54) TERMINAL AND COMMUNICATION METHOD THEREOF

(71) Applicants: ELECTRONICS AND TELECOMMUNICATIONS RESEARCH INSTITUTE, Daejeon (KR); Industry-Academic Cooperation Foundation, Chosun University, Gwangju (KR)

(72) Inventors: Won-Ik Kim, Daejeon (KR); Eunkyung Kim, Daejeon (KR); Sung Kyung Kim, Daejeon (KR); Sung Cheol Chang, Daejeon (KR); Jae Sun Cha, Daejeon (KR); Mi Young Yun, Daejeon (KR); Seokki Kim, Gyeonggi-do (KR); Hyun Lee, Daejeon (KR); Chul Sik Yoon, Seoul (KR); Kwang Jae Lim, Daejeon (KR); Seokjoo Shin, Gwangju (KR)

(73) Assignees: ELECTRONICS AND TELECOMMUNICATIONS RESEARCH INSTITUTE, Daejeon (KR); INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 103 days.

(21) Appl. No.: 13/737,941

(22) Filed: Jan. 9, 2013

(65) Prior Publication Data
US 2013/0176935 A1     Jul. 11, 2013

(30) Foreign Application Priority Data

Jan. 10, 2012  (KR) .................. 10-2012-0002889
Dec. 13, 2012  (KR) .................. 10-2012-0145553

(51) Int. Cl.
*H04B 7/14*      (2006.01)
*H04W 88/04*   (2009.01)
*H04W 36/00*   (2009.01)

(52) U.S. Cl.
CPC ............... *H04B 7/14* (2013.01); *H04W 88/04* (2013.01); *H04W 36/0055* (2013.01)

(58) Field of Classification Search
CPC ..... H04W 88/04; H04W 88/08; H04W 48/08; H04W 88/06; H04W 84/12; H04W 36/0055; H04W 12/06; H04W 36/14; H04B 7/14
USPC .......... 370/312, 315, 331, 332, 323, 336, 437
See application file for complete search history.

(56) References Cited

U.S. PATENT DOCUMENTS 7,986,915 B1 *  7/2011  Wang et al. ..................... 455/7
8,155,086 B2 *  4/2012  Jung ................. H04W 36/0055
                                                        370/331

(Continued)

FOREIGN PATENT DOCUMENTS

| KR | 10-2005-0078627 A | 8/2005 |
| KR | 10-2010-0113962 A | 10/2010 |
| KR | 10-2011-0092200 A | 8/2011 |

OTHER PUBLICATIONS

IEEE 802.16 Broadband Wireless Access Working Group, "802.16n Amendment Working Draft," IEEE 802.16n-11/0009r1, May 27, 2011.

*Primary Examiner* — Brian O'Connor
(74) *Attorney, Agent, or Firm* — Rabin & Berdo, P.C.

(57) ABSTRACT

A communication method of a terminal that can operate in a relay mode or a base station mode is provided. When the terminal, having received a service from a first base station, detects that a service connection to the first base station is unavailable, the terminal searches for a second base station, which is an available neighboring base station. The terminal transmits a ranging request message including a base station identifier of the first base station to the second base station.

8 Claims, 5 Drawing Sheets

(56) References Cited

U.S. PATENT DOCUMENTS

| | | | |
|---|---|---|---|
| 8,165,090 B2* | 4/2012 | Nix | 370/331 |
| 8,165,585 B2* | 4/2012 | Gallagher et al. | 455/436 |
| 8,259,678 B2 | 9/2012 | Jung et al. | |
| 8,625,798 B2* | 1/2014 | Baek et al. | 380/270 |
| 9,042,341 B2* | 5/2015 | Jung | H04W 36/385 370/331 |
| 2008/0049674 A1 | 2/2008 | Cha et al. | |
| 2009/0285176 A1* | 11/2009 | Zheng et al. | 370/331 |
| 2010/0074220 A1* | 3/2010 | Jung et al. | 370/331 |
| 2010/0182900 A1* | 7/2010 | Sung et al. | 370/210 |
| 2011/0194420 A1 | 8/2011 | Park et al. | |
| 2011/0317665 A1* | 12/2011 | Jung et al. | 370/331 |
| 2012/0106481 A1* | 5/2012 | Cho et al. | 370/329 |
| 2012/0165021 A1* | 6/2012 | Jung | H04W 36/0055 455/437 |
| 2012/0225650 A1* | 9/2012 | Son et al. | 455/434 |
| 2013/0059565 A1* | 3/2013 | Jung et al. | 455/411 |
| 2013/0310016 A1* | 11/2013 | Park et al. | 455/418 |
| 2014/0031063 A1* | 1/2014 | Park et al. | 455/456.1 |

* cited by examiner

TERMINAL AND COMMUNICATION METHOD THEREOF

CROSS-REFERENCE TO RELATED APPLICATION

This application claims priority to and the benefit of Korean Patent Application Nos. 10-2012-0002889 and 10-2012-0145553 filed in the Korean Intellectual Property Office on Jan. 10, 2012 and Dec. 13, 2012, the entire contents of which are incorporated herein by reference.

BACKGROUND OF THE INVENTION (a) Field of the Invention

The present invention relates to a terminal and a communication method thereof.

(b) Description of the Related Art

When a disaster or a calamity occurs, an important social infrastructure may be destroyed or damaged. Various communication facilities such as a wireless phone, a wired phone, and an Internet network are important social infrastructures, and when such a communication facility is destroyed or damaged, social congestion increases, and it may be difficult to secure society recovery.

Therefore, even in such a situation, a high reliability support that provides a method that can quickly restore or replace a communication facility is important.

Particularly, as a base station that performs a central function of communication of a mobile terminal is damaged or as a power line is destroyed, when the base station does not perform a function thereof, a service unavailable area may variously occur.

Therefore, it is necessary to provide a means that can provide a wireless communication service in a service unavailable area due to damage of a base station.

Nowadays, when a service unavailable area occurs, IEEE 802.16n, which is an international standardization conference, has suggested a method in which a multi-mode terminal performs a function of a relay mode or a base station as well as direct communication between terminals as a wireless communication replacement means. According to amendment working draft [1] of IEEE 8012.16n, when a mobile communication infrastructure may no longer operate a network or as an auxiliary replacement means according to a special mission, a multi-mode terminal can construct and operate a temporary network by a request of a superordinate base station or by converting a function thereof to a function of a relay station or a base station.

In this way, in order for the multi-mode terminal to perform a function of a relay station or a base station, it is necessary for a superordinate base station to select an optimal terminal to operate in a relay mode or a base station mode in lower multi-mode terminals. When candidate multi-mode terminals mount a satellite position-based system such as a GPS, the superordinate base station grasps a position of a multi-mode terminal using such a satellite position-based system and selects an optimal multi-mode terminal through the grasped position. However, when the multi-mode terminal does not mount a GPS, another method in which a superordinate base station grasps a position of the multi-mode terminal is necessary.

SUMMARY OF THE INVENTION

The present invention has been made in an effort to provide a terminal and a communication method thereof having advantages of selecting an optimal multi-mode terminal to operate in a relay mode or a base station mode.

An exemplary embodiment of the present invention provides a communication method of a terminal that can operate in a relay mode or a base station (BS) mode. The communication method includes: detecting, by the terminal, having received a service from a first BS, whether a service connection to the first BS is unavailable; searching for, when the terminal detects that a service connection to the first BS is unavailable, a second BS, which is an available neighboring BS; and transmitting, by the terminal, a ranging request message including a BS identifier (BSID) of the first BS to the second BS.

The communication method may further include selecting, by the second BS, when restoring a temporary network through the terminal, an optimal multi-mode terminal using the BSID.

The ranging request message may include a coverage loss indicator field, when the terminal searches for the second BS after a predetermined delay time.

The ranging request message may further include a ranging purpose indication field, and the ranging purpose indication field may be set to information representing initial network entry.

The ranging request message may include a ranging purpose indication field, and the ranging purpose indication field may be set to information representing initial network entry by coverage loss, when the terminal searches for the second BS after a predetermined delay time.

The ranging request message may include a ranging purpose indication field, and the ranging purpose indication field may be set to information representing network reentry, when the terminal immediately searches for the second BS without a delay time.

Another embodiment of the present invention provides a terminal. The terminal includes: a radio frequency (RF) module; and a processor that is connected to the RF module and that controls to operate in a relay mode or a BS mode, wherein the processor controls to search for an available neighboring BS and to transmit a ranging request message including a BSID of the serving BS to the neighboring BS, when it is detected whether a service with a serving BS is unavailable.

The neighboring BS may select a multi-mode terminal using the BSID, when a temporary network is restored through the terminal.

The ranging request message may include a coverage loss indicator field, when the neighboring BS is found after a predetermined delay time.

The processor may control to perform an initial network entry procedure to the neighboring BS, when the neighboring BS is found after a predetermined delay time, the ranging request message may include a ranging purpose indication field, and the ranging purpose indication field may be set to information representing initial network entry by a coverage loss.

The processor may control to perform a network reentry procedure to the neighboring BS terminal, when the neighboring BS is immediately found without a delay time.

According to an exemplary embodiment of the present invention, when a BS adjacent to a broken cell (i.e., a service unavailable cell) restores a temporary network through a multi-mode terminal, an optimal multi-mode terminal to operate in a relay mode or a BS mode can be selected using a BSID of a previous serving BS of connected multi-mode terminals.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a mobile station (MS) may indicate a terminal, a mobile terminal (MT), an advanced mobile station (AMS), a high reliability mobile station (HR-MS), a subscriber station (SS), a portable subscriber station (PSS), an access terminal (AT), and user equipment (UE), and may include an entire function or a partial function of the terminal, the MT, the AMS, the HR-MS, the SS, the PSS, the AT, and the UE.

Further, in this specification, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a function of the BS, and a high reliability relay station (HR-RS) that performs a function of the BS, and may include an entire function or a partial function of the ABS, the node B, the eNodeB, the AP, the RAS, the BTS, the MMR-BS, the RS, and the HR-RS.

Figure 1:
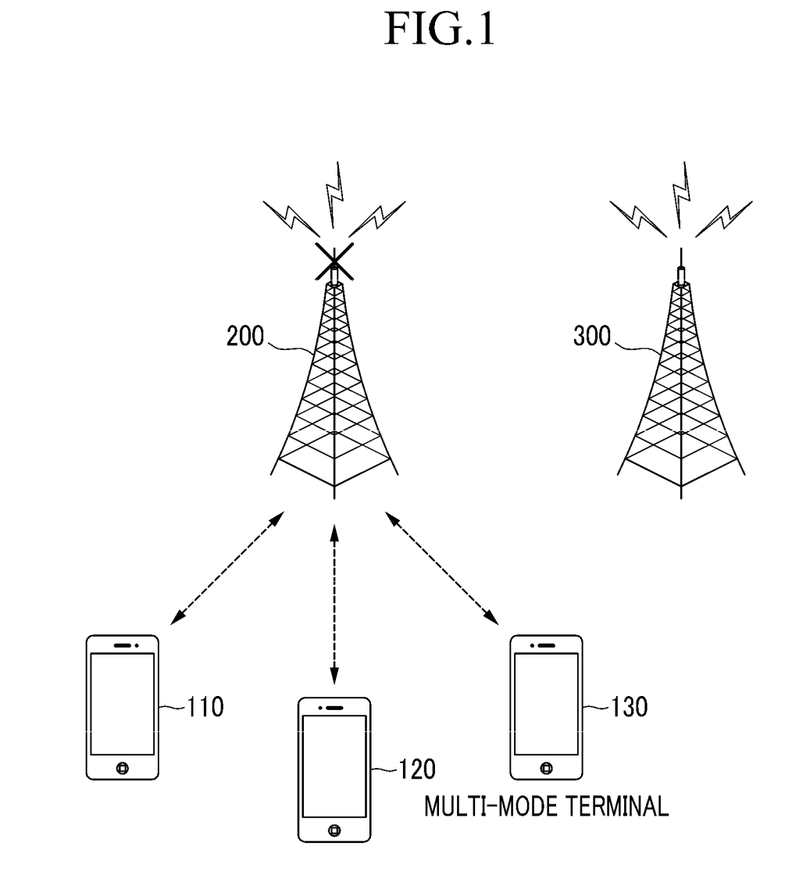
FIG. 1 is a diagram illustrating a damaged BS in a mobile communication system according to an exemplary embodiment of the present invention.

FIG. 1 is a diagram illustrating a damaged BS in a mobile communication system according to an exemplary embodiment of the present invention.

The mobile communication system according to an exemplary embodiment of the present invention includes BSs 200 and 300 and lower terminals 110, 120, and 130 within a cell in which the BS 200 services.

Here, when the BS 200 is damaged due to a disaster or a calamity while providing a service to the lower terminals 110, 120, and 130, the BS 200 does not appropriately perform a function of a BS, and hereinafter, the BS 200 is referred to as a 'serving BS'.

When the serving BS 200 is damaged, a service unavailable area occurs, and thus the lower terminals 110, 120, and 130 have a problem in a mobile communication service, but in an exemplary embodiment of the present invention, in the lower terminals 110, 120, and 130, a terminal to operate in a relay mode or a BS mode is selected. In FIG. 1, the terminal 130 is represented as a multi-mode terminal to operate in a relay mode or a BS mode, and hereinafter, the terminal 130 is assumed to be a multi-mode terminal.

When a service with the serving BS 200 is interrupted, the multi-mode terminal 130 searches for an available neighboring BS, and hereinafter, the BS 300 is assumed to be a neighboring BS.

In an exemplary embodiment of the present invention, as a method in which the multi-mode terminal 130 indirectly notifies a position thereof, the multi-mode terminal 130 notifies the neighboring BS 300 of a BS identifier (hereinafter referred to as a 'BSID') of the serving BS 200. That is, in an exemplary embodiment of the present invention, when the multi-mode terminal 130 in which a service is interrupted by a coverage loss performs a network reentry or initial network entry procedure to the available neighboring BS (neighboring BS 300 in FIG. 1), the multi-mode terminal 130 notifies a BSID of the previous serving BS 200 thereof, and hereinafter, a method and procedure thereof will be described in detail with reference to FIGS. 2 to 4.

While the multi-mode terminal 130 receives a service from the serving BS 200, when a service connection is interrupted for a predetermined time due to breakdown or other reasons of the serving BS 200, the multi-mode terminal 130 determines this as a coverage loss and searches for an available neighboring BS in order to connect to a new cell. In this case, the multi-mode terminal 130 attempts a network reentry or initial network entry procedure to the neighboring BS 300.

Here, when the multi-mode terminal 130 recognizes a coverage loss and can immediately find a new available cell, i.e., the neighboring BS 300, the multi-mode terminal 130 performs a network reentry procedure of FIG. 2 to be described later.

After the multi-mode terminal 130 recognize a coverage loss, when the multi-mode terminal 130 can find a new available cell, i.e., the neighboring BS 300 after a predetermined time delay, the multi-mode terminal 130 performs an initial network entry procedure of FIGS. 3 and 4 to be described later.

Figure 2:
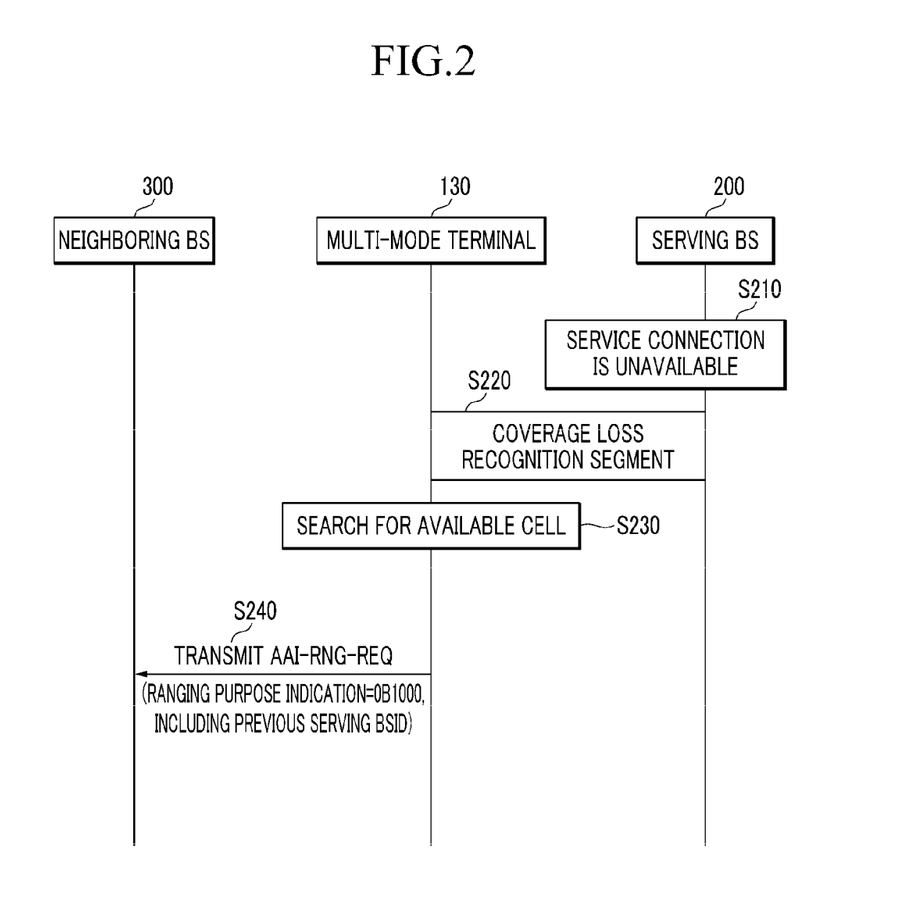
FIG. 2 is a flowchart illustrating a method of transmitting a BSID of a serving BS to a neighboring BS when a multi-mode terminal reconnects to a network according to an exemplary embodiment of the present invention.

FIG. 2 is a flowchart illustrating a method of transmitting a BSID of a serving BS to a neighboring BS 300 when the multi-mode terminal 130 performs network reentry according to an exemplary embodiment of the present invention.

When the serving BS 200 is broken without advance notice due to a disaster or a calamity, the multi-mode terminal 130 determines whether a service connection is unavailable at a predetermined segment (coverage loss recognition segment) (S210 and S220).

When a service connection unavailable state is continued at a predetermined segment, the multi-mode terminal 130 determines that a service connection is unavailable and searches for an available neighboring BS (S230).

Here, when the multi-mode terminal 130 finds an available neighboring BS (assumed to be a neighboring BS 300) without a delay time, the multi-mode terminal 130 starts a network reentry procedure to the neighboring BS 300.

When performing a network reentry procedure, the multi-mode terminal 130 transmits an advanced air interface-ranging-request (AAI-RNG-REQ) to the neighboring BS 300 (S240). Here, a ranging purpose indication field of the AAI-RNG-REQ is set to 0b1000 (representing network reentry). The multi-mode terminal 130 includes a BSID of the previous serving BS 200 in the AAI-RNG-REQ and transmits the AAI-RNG-REQ to the neighboring BS 300, which is a new BS.

When the neighboring BS 300, having received the AAI-RNG-REQ from the multi-mode terminal 130, later selects a multi-mode terminal for restoring a temporary network in a relay mode or a BS mode, the neighboring BS 300 preferentially selects the multi-mode terminal 130 that is entered from a neighboring cell of a service unavailable state. That is, when the neighboring BS 300, having received the AAI-RNG-REQ, later detects an unavailable state of a neighboring cell and selects the multi-mode terminal 130, the neighboring BS 300 preferentially selects the multi-mode terminal 130 that is entered from a neighboring cell of a service unavailable state.

As shown in FIG. 2, when a network reentry procedure is performed, the multi-mode terminal 130 includes a BSID of a previous serving BS within the AAI-RNG-REQ and transmits the AAI-RNG-REQ to a new BS.

Unlike a case of FIG. 2, when the multi-mode terminal 130 performs an initial network entry procedure, a method of transmitting a fact that a BSID of a previous serving BS thereof within the AAI-RNG-REQ and coverage of a serving cell thereof (i.e., a serving BS) are lost to a new BS is necessary.

Figure 3:
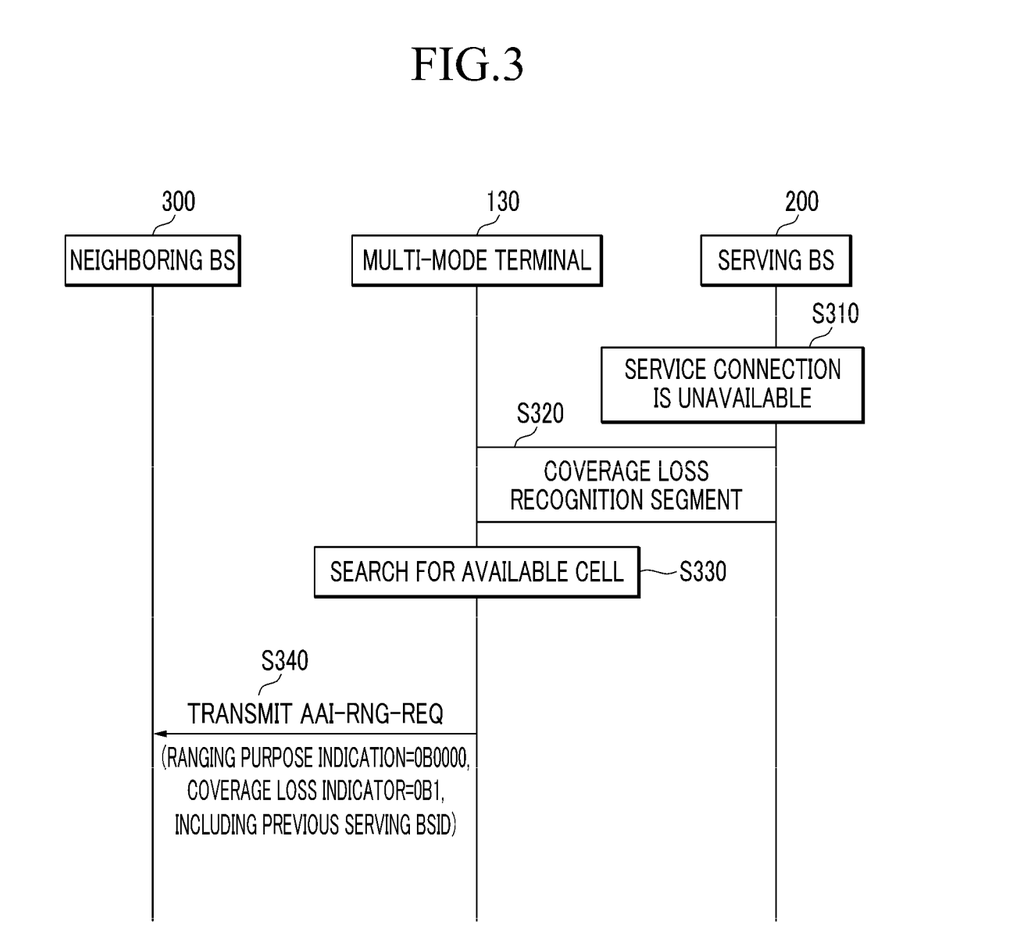
FIG. 3 is a flowchart illustrating a method of transmitting a BSID of a serving BS to a neighboring BS when a multi-mode terminal enters an initial network according to an exemplary embodiment of the present invention.

FIG. 3 is a flowchart illustrating a method of transmitting a BSID of a serving BS to a neighboring BS 300 when the multi-mode terminal 130 enters an initial network according to an exemplary embodiment of the present invention.

When the serving BS 200 is broken without advance notice due to a disaster or a calamity, the multi-mode terminal 130 determines whether a service connection is unavailable at a predetermined segment (coverage loss recognition segment) (S310 and S320).

When a service connection unavailable state is continued at a predetermined segment, the multi-mode terminal 130 determines that a service connection is unavailable and searches for an available neighboring BS (S330).

Here, when the multi-mode terminal 130 finds an available neighboring BS (assumed to be a neighboring BS 300) after a predetermined delay time, the multi-mode terminal 130 starts an initial network entry procedure to the neighboring BS 300.

When performing an initial network entry procedure, the multi-mode terminal 130 transmits an AAI-RNG-REQ to the neighboring BS 300 (S340). In this case, as shown in Table 1, a ranging purpose indication field of the AAI-RNG-REQ is set to 0b0000, and a coverage loss indicator field is set to 0b1. The multi-mode terminal 130 includes a BSID of the previous serving BS 200 in the AAI-RNG-REQ and transmits the AAI-RNG-REQ to the neighboring BS 300, which is a new BS.

When the neighboring BS 300, having received the AAI-RNG-REQ from the multi-mode terminal 130, later selects a multi-mode terminal for restoring a temporary network in a relay mode or a BS mode, the neighboring BS 300 preferentially selects the multi-mode terminal 130 that is entered from a neighboring cell of a service unavailable state. That is, when the neighboring BS 300, having received the AAI-RNG-REQ, later detects an unavailable state of a neighboring cell and selects a multi-mode terminal, the neighboring BS 300 preferentially selects the multi-mode terminal 130 that is entered from a neighboring cell of a service unavailable state.

TABLE 1

| AAI-RNG-REQ message format | | | |
|---|---|---|---|
| Field | Size (bits) | Value/Description | Condition |
| Ranging Purpose Indication | 4 | 0b0000 = Initial network entry<br>0b0001 = HO reentry<br>0b0010 = Network reentry from idle mode<br>0b0011 = Idle mode location update 0b0100 = DCR mode extension<br>0b0101 = Emergency call setup (e.g., E911)<br>0b0110 = Location update for updating service flow management encodings of E-MBS flows<br>0b0111 = Location update for transition to DCR mode from idle mode<br>0b1000 = Reentry from DCR mode, coverage loss or detection of different ABS restart count<br>0b1001 = Network reentry from a Legacy BS<br>0b1010 = Zone switch to MZONE from LZONE<br>0b1011 = Location update due to power down<br>0b1100 = Interference mitigation request to a CSG Femto ABS when experiencing interference from the CSG Femto ABS<br>0b1101 = NS/EP call setup<br>0b1110 = HR multicast service location update<br>0b1111 = Network reentry for FBIS operation | — |
| If (Ranging Purpose Indication == 0b0000)<br>{<br>  If (S-SFH Network Configuration bit == | | // Initial network entry | |

TABLE 1-continued

AAI-RNG-REQ message format

| Field | Size (bits) | Value/Description | Condition |
|---|---|---|---|
| 0b0 and AMSID privacy is enabled) { | | | |
|     AMSID* | 48 | The AMSID hash value. Refer to 16.2.5.3.1 | |
| } else if (S-SFH Network Configuration bit == 0b1 or AMSID privacy is disabled){ | | | |
|     AMS MAC address | 48 | AMS's real MAC address | |
| } | | | |
| MAC version | 8 | See 11.1.3 | |
| Initial Offset for uplink power control (OffsetInitial) | 5 | The bit size represents power level ranging from −15 dB 0x00 to 16 dB (0x1F) with 1 dB step. The value is determined by AMS after successful initial ranging process. | |
| Coverage loss indicator | 1 | 0b0: Initial network entry 0b1: Initial network entry by coverage loss | |
| If (Coverage loss indicator == 0b1) { | | | |
|     Serving BSID | 48 | The BSID of the HR-MS's previous Serving HR-BS before incurring a coverage loss | |
| } | | | |
| } | | | |
| ... | ... ... | | ... |

Figure 4:
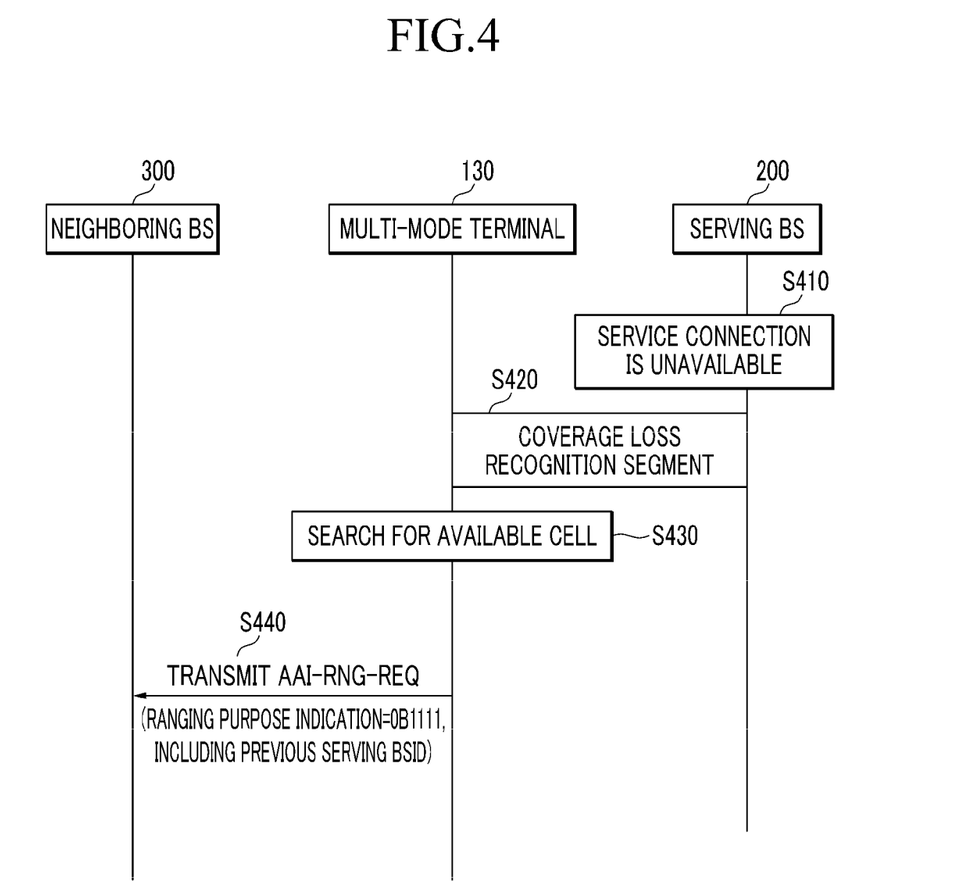
FIG. 4 is a flowchart illustrating another method of transmitting a BSID of a serving BS to a neighboring BS when a multi-mode terminal enters an initial network according to an exemplary embodiment of the present invention.

FIG. 4 is a flowchart illustrating another method of transmitting a BSID of a serving BS to a neighboring BS 300 when the multi-mode terminal 130 enters an initial network according to an exemplary embodiment of the present invention.

When the serving BS 200 is broken without advance notice due to a disaster or a calamity, the multi-mode terminal 130 determines whether a service connection is unavailable at a predetermined segment (coverage loss recognition segment) (S410 and S420).

When a service connection unavailable state is continued at a predetermined segment, the multi-mode terminal 130 determines that a service connection is unavailable and searches for an available neighboring BS (S430).

Here, when the multi-mode terminal 130 finds an available neighboring BS (assumed to be a neighboring BS 300) after a predetermined delay time, the multi-mode terminal 130 starts an initial network entry procedure to the neighboring BS 300.

When performing an initial network entry procedure, the multi-mode terminal 130 transmits an AAI-RNG-REQ to the neighboring BS 300 (S440). In this case, as shown in Table 2, a ranging purpose indication field of the AAI-RNG-REQ is set to 0b1111. The multi-mode terminal 130 includes a BSID of the previous serving BS 200 in the AAI-RNG-REQ and transmits the AAI-RNG-REQ to the neighboring BS 300, which is a new BS. Here, 0b1111 of the ranging purpose indication field represents initial network entry by a coverage loss.

When the neighboring BS 300, having received the AAI-RNG-REQ from the multi-mode terminal 130, later selects a multi-mode terminal for restoring a temporary network in a relay mode or a BS mode, the neighboring BS 300 preferentially selects the multi-mode terminal 130 that is entered from a neighboring cell of a service unavailable state. That is, when the neighboring BS 300, having received the AAI-RNG-REQ, later detects an unavailable state of a neighboring cell and selects the multi-mode terminal 130, the neighboring BS 300 preferentially selects the multi-mode terminal 130 that is entered from a neighboring cell of a service unavailable state.

TABLE 2

AAI-RNG-REQ message format

| Field | Size (bits) | Value/Description | Condition |
|---|---|---|---|
| Ranging Purpose Indication | 4 | 0b0000 = Initial network entry 0b0001 = HO reentry 0b0010 = Network reentry from idle mode 0b0011 = Idle mode location update 0b0100 = DCR mode extension 0b0101 = Emergency call setup (e.g., E911) | — |

TABLE 2-continued

AAI-RNG-REQ message format

| Field | Size (bits) | Value/Description | Condition |
|---|---|---|---|
| | | 0b0110 = Location update for updating service flow management encodings of E-MBS flows<br>0b0111 = Location update for transition to DCR mode from idle mode<br>0b1000 = Reentry from DCR mode, coverage loss or detection of different ABS restart count<br>0b1001 = Network reentry from a Legacy BS<br>0b1010 = Zone switch to MZONE from LZONE<br>0b1011 = Location update due to power down.<br>0b1100 = Interference mitigation request to a CSG Femto ABS when experiencing interference from the CSG Femto ABS<br>0b1101 = NS/EP call setup<br>0b1110 = HR multicast service location update<br>0b1111 = Initial network entry by coverage loss | |
| ... | ... | ... | ... |
| If (Ranging Purpose Indication == 0b1111)<br>{<br>  If (S-SFH Network Configuration bit == 0b0 and AMSID privacy is enabled) {<br>    AMSID* | 48 | // Initial network entry by coverage loss<br><br><br><br><br><br>The AMSID hash value. Refer to 16.2.5.3.1 | |
| } else if (S-SFH Network Configuration bit == 0b1 or AMSID privacy is disabled){<br>  AMS MAC address<br>} | 48 | AMS's real MAC address | |
| MAC version | 8 | See 11.1.3 | |
| Initial Offset for uplink power control (OffsetInitial) | 5 | The bit size represents power level ranging from −15 dB 0x00 to 16 dB (0x1F) with 1 dB step. The value is determined by AMS after successful initial ranging process. | |
| Coverage loss indicator | 1 | 0b0: Initial network entry<br>0b1: Initial network entry by coverage loss | |
| Serving BSID | 48 | The BSID of the HR-MS's previous Serving HR-BS before incurring a coverage loss | |
| }<br>... | ... ... | | ... |

Figure 5:
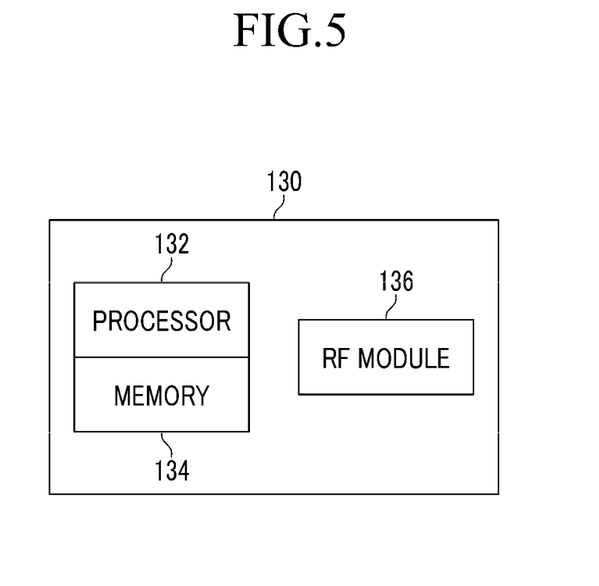
FIG. 5 is a block diagram illustrating a configuration of a multi-mode terminal according to an exemplary embodiment of the present invention.

FIG. 5 is a block diagram illustrating a configuration of the multi-mode terminal 130 according to an exemplary embodiment of the present invention.

Referring to FIG. 5, the mobile relay station/relay mode multi-mode terminal 130 includes a processor 132, a memory 134, and a radio frequency (RF) module 136. The processor 132 is formed to embody the above-described procedure and method. The memory 134 is connected to the processor 132 and stores various information that is related to operation of the processor 132. The RF module 136 is connected to the processor 132 and transmits or receives a wireless signal. The multi-mode terminal 130 has a single antenna or a multiple antenna.

In this way, according to an exemplary embodiment of the present invention, when a BS adjacent to a broken cell, i.e., a service unavailable cell, restores a temporary network through a multi-mode terminal, the BS selects an optimal multi-mode terminal to operate in a relay mode or a BS mode using a BSID of a previous serving BS of connected multi-mode terminals.

According to an exemplary embodiment of the present invention, when network reentry or initial network entry occurs by a large coverage loss, by analogizing out of coverage for cell coverage of a neighboring area, it will be helpful in determination for restoring a corresponding area.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of a terminal that is operable in a relay mode or a base station (BS) mode, the communication method comprising:
   detecting, by the terminal having received a service from a first BS, whether a service connection to the first BS is unavailable;
   searching for, by the terminal upon detecting that the service connection to the first BS is unavailable, a second BS that is available to communicate with the terminal; and
   transmitting, by the terminal upon finding the second BS, a ranging request message to the second BS, the ranging request message including
      a BS identifier (BSID) of the first BS, and
      a ranging purpose indication field set
         to indicate a network reentry if the second BS is found within a predetermined delay time, and
         to indicate an initial network entry if the second BS is found after the predetermined delay time.

2. The communication method of claim 1, further comprising selecting, by the second BS when restoring a temporary network through the terminal, an optimal multi-mode terminal using the BSID.

3. The communication method of claim 1, wherein the ranging request message further includes a coverage loss indicator field, which is set to indicate coverage loss when the terminal finds the second BS after the predetermined delay time.

4. The communication method of claim 1, wherein when the ranging purpose indication field is set to indicate an initial network entry, the ranging request message uses the ranging purpose indication field, or a coverage loss indicator field, to indicate that coverage of the first BS is lost.

5. A terminal comprising:
   a radio frequency (RF) module; and
   a processor that is connected to the RF module and that controls the terminal to operate in a relay mode or a base station (BS) mode,
   wherein the processor is configured to so control the terminal that the terminal
      searches for an available neighboring BS upon detecting that a service connection with a serving BS is unavailable, and
      transmits a ranging request message to the neighboring BS upon finding the available neighboring BS, the ranging request message including
         a BS identifier (BSID) of the serving BS, and
         a ranging purpose indication field set
            to indicate a network reentry if the neighboring BS is found within a predetermined delay time, and
            to indicate an initial network entry if the neighboring BS is found after the predetermined delay time.

6. The terminal of claim 5, wherein the neighboring BS selects a multi-mode terminal using the BSID when a temporary network is restored through the terminal.

7. The terminal of claim 5, wherein the ranging request message further comprises a coverage loss indicator field, which is set to indicate coverage loss when the neighboring BS is found after the predetermined delay time.

8. The terminal of claim 5, wherein when the ranging purpose indication field is set to indicate an initial network entry, the ranging request message uses the ranging purpose indication field, or a coverage loss indicator field, to indicate that coverage of the serving BS is lost.

* * * * *